Patented Oct. 26, 1948

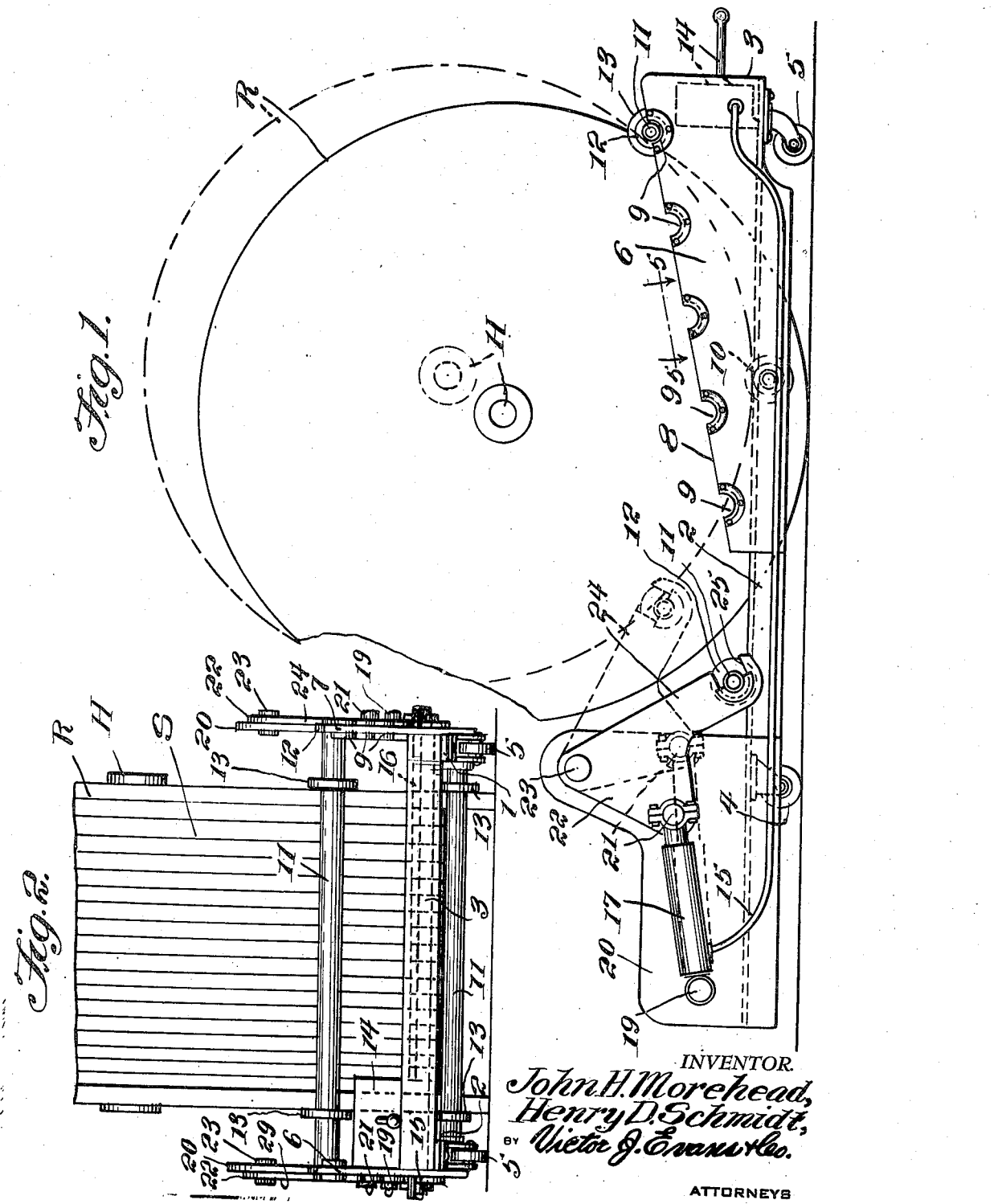

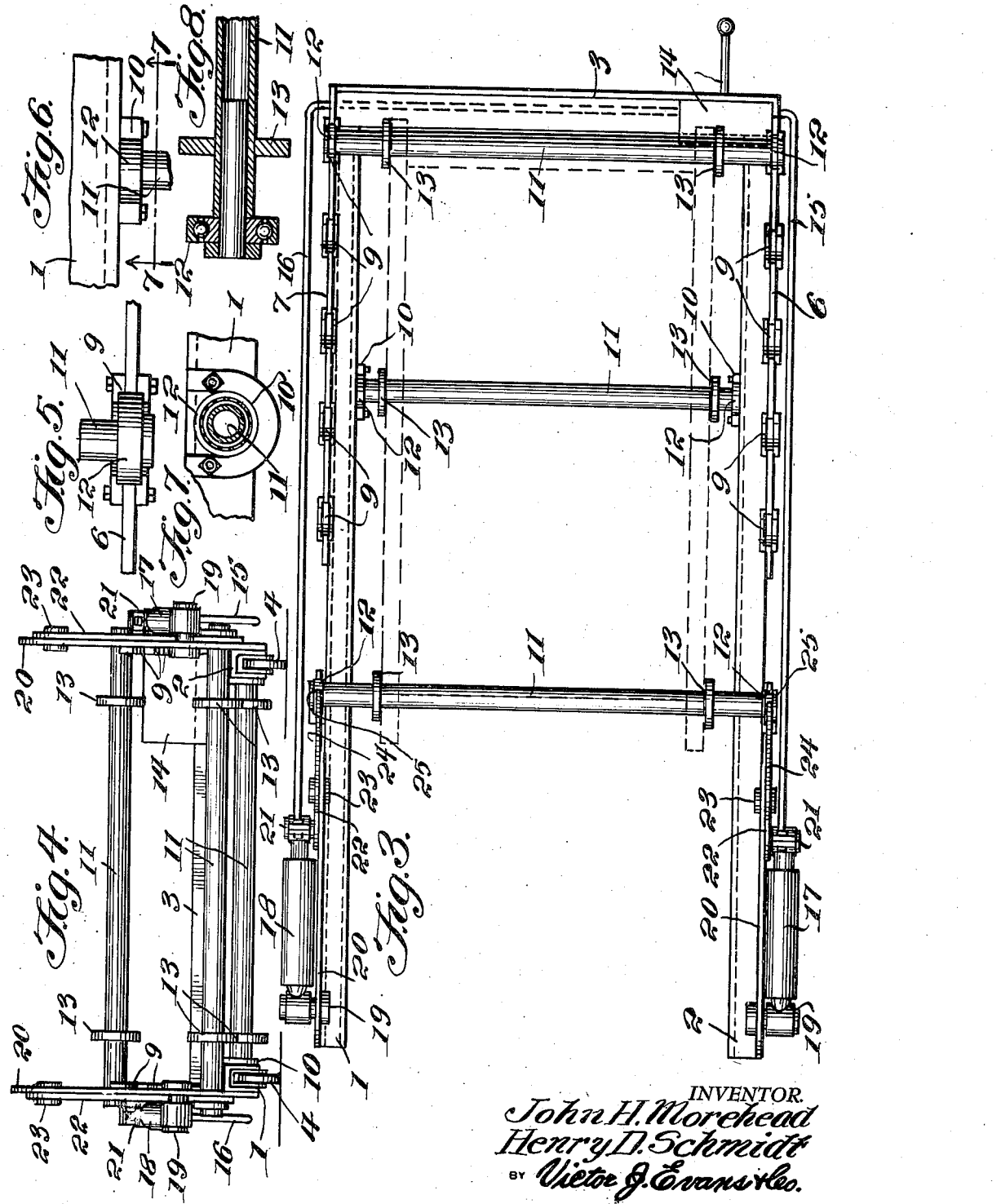

2,452,481

UNITED STATES PATENT OFFICE 2,452,481

HYDRAULIC REEL MOUNT FOR WAREHOUSE TRUCKS

John H. Morehead and Henry D. Schmidt, Long Beach, Calif.

Application December 17, 1946, Serial No. 716,716

5 Claims. (Cl. 214—65)

The present invention relates generally to winding, reeling, and unreeling carriers for cables, belting, hose, and similar commodities, and more specifically to an improved hydraulic reel mount for warehouse trucks of the hand controlled wheeled-implement type, employing manually controlled fluid pressure operated elevating means for mounting the reel in the carrier. While the appliance of our invention is adapted for use in warehouses, storerooms, and industrial plants, for supporting and transporting various types of reels, it is especially designed and hereinafter referred to for use in handling cylindrical reels of belting.

The primary object of the invention is the provision of a wheel carrier that includes a minimum number of component parts, including removable and interchangeable supporting rollers, which may with facility be manufactured at low cost of production, and assembled with convenience to afford a mechanical structure for elevating and supporting a reel or similar device.

The invention consists in certain novel features of construction and combinations and arrangements of parts involving a wheeled base, interchangeable supporting rollers mounted upon the base, and elevating means for mounting a reel upon the rollers, as will hereinafter be described, and more specifically set forth in the accompanying claims.

In the drawings we have illustrated one complete example of a physical embodiment of our invention in which the parts are combined and arranged in accord with one mode we have devised for the practical application of the principles of our invention. It will, however, be understood that changes and alterations are contemplated and may be made in these exemplifying drawings and mechanical structures, within the scope of our claims, without departing from the principles of the invention.

Figure 1 is a view in side elevation of a wheeled carrier in which our invention is embodied, showing by full lines a reel standing on a floor, and by dotted lines the position of the reel after it has been mounted upon the carrier.

Figure 2 is a view in front elevation, as seen from the right in Fig. 1, with a reel of belting supported in the carrier or wheeled truck.

Figure 3 is a top plan view of the implement, showing by dotted lines the reel mounted in a cradle formed by the interchangeable rollers.

Figure 4 is a view in front elevation of the wheeled implement.

Figure 5 is an enlarged detail plan view of one of a series of bearing sockets and showing a roller mounted therein, as at line 5—5 of Fig. 1.

Figure 6 is a similar view of another bearing socket with an interchangeable roller mounted therein; and Figure 7 is a detail vertical sectional view at line 7—7 of Fig. 6.

Figure 8 is a longitudinal detail sectional view showing one end of one of the interchangeable and removable rollers, utilized in supporting the reel.

In order that the general arrangement and relation of parts may readily be understood, we have shown a cylindrical reel R upon which the belting S is wound in usual manner, and the reel is provided with the usual transverse central hub H for the conventional bearing axle, not shown; and the purpose of the invention is to provide an appliance by means of which the reel may be elevated from a standing position on a floor and mounted in the carrier or wheeled truck of our invention.

In carrying out our invention the carrier preferably includes a horizontally disposed metallic frame or U-shaped base having a pair of laterally spaced longitudinally extending side bars 1 and 2, and a rear cross bar 3, which are rigidly united in suitable manner to provide a mechanical structure that is supported by a pair of front wheels 4, 4, and a pair of rear wheels 5, 5, that have swivel mounts on the frame to enable the operator to steer the implement.

The implement, which is supported in slightly elevated position may be maneuvered by pushing or pulling, or if desired power operated means may be utilized in propelling the implement over a floor or other surface.

At the opposite sides of the base or frame, a pair of laterally spaced, longitudinally extending, upright bedplates 6 and 7 are rigidly mounted and united with the base, and each bed-plate is provided with an upper edge 8 that inclines upwardly toward the rear end of the implement.

These inclined upper edges of the bed plates are each equipped with a series of spaced bearing notches, or semi-circular sockets 9, the sockets of the two series being axially arranged in pairs, and each socket is reinforced by an open-top U-shaped bearing for the reception and support of selected interchangeable and removable supporting rollers that form the cradle or mount for the reel.

In addition to the two series of bearing sockets 9 of the bed plates, an axially alined pair of similar bearings 10, 10, are utilized, and mounted at the inner sides of the side bars 1 and 2, below the lowermost bearing socket 9 of the bed plates.

The construction and operation of the interchangeable and removable supporting rollers forming a bed for the reel are identical, and the details of a roller are shown in Fig. 8, where a tubular shaft or pipe 11 forms the roller, which is of ample length to extend transversely of the base.

At its opposite ends the roller is equipped with a ball bearing 12 that is adapted to slip into and seat in one of the bearing sockets 9 or 10, and circular retaining disks or guides 13 are mounted near the journaled ends of the roller for coaction with the outer faces of the cylindrical heads of the reel R.

For use in mounting the reel upon its carrier we employ a hydraulic, lever-actuated appliance or elevator located at the front portion of the implement, and motive fluid is supplied to the elevator from a manually controlled pumping unit 14 that is mounted on the rear cross bar of the base, and from which fluid pressure is conveyed by two pipes 15 and 16 extended around the base from the pumping unit to the elevator.

The reel-elevator includes two conventional hydraulic jacks 17 and 18 that are simultaneously controlled by the operator of the carrier from the unit 14, and as each jack and its lever mechanism are identical, a description of one will suffice for both.

Each jack is pivotally mounted as at 19 upon the outer side of two laterally spaced, longitudinally extending, upright bearing frame-plates 20, 20, that are rigidly united, as by welding on the outer faces of the side bars of the base.

At 21, each jack is pivotally connected to a triangular actuating lever 22 of the bell-crank type that is pivotally suspended at 23 on the exterior face of the plate 20, and a rear arm 24 of each lever is provided with a semi-circular bearing socket 25 similar to the bearing sockets 9 and 10. The two bearing sockets 25, 25, are adapted to receive and support one of the interchangeable and removable rollers which are mounted by their roller bearings within the sockets, and the roller thus supported unites the two elevating levers 22, 22 to provide an elevating or pushing bar for the reel.

In actual practice the U-shaped base may be run alongside the standing reel indicated by full lines in Fig. 1, and after the base has been properly centered with relation to the reel, a roller is mounted at the rear of the reel, as in the topmost pair of bearings; and an elevating roller is mounted between the levers of the elevator. Then under manual control of the pumping unit, the elevator may be actuated to bear up against the front portion of the reel and elevate the reel as its rear end rests upon the rear roller. The reel may be elevated sufficiently to permit placing an intermediate roller in the bearings 10, 10, and then the reel is lowered to dotted line position in Fig. 1 where it is resting or mounted upon the three spaced rollers.

For unloading the reel from its mount the above described performance is reversed; the reel is first elevated sufficiently to permit removal of the intermediate roller and then the reel is lowered by the elevator to the ground or floor, after which the elevating roller is withdrawn from the reel and removed from its supporting levers. With the support of the rollers withdrawn, and the reel standing in upright position on the floor, the wheeled implement or carrier may be withdrawn from its operative relation to the reel.

The use of two series of journal bearings at varying altitudes on the bed plates provides for handling of reels of different diameters, and they also provide means for supporting a reel at varying heights above the floor or ground surface; and in some instances a reel may be mounted upon a single rear roller and the front elevating roller.

The interchangeable rollers may be handled with facility when placing them in operative positions and in withdrawing them from working position, and the load of the reel in mounting and dismounting may with facility be supported by the hydraulic elevator under simple controlling means of the pumping unit.

Having thus fully described our invention, what we claim as new and desire to secure by Letters Patent is:

1. In a reel carrier, the combination with a horizontally disposed U-shaped base having a pair of longitudinally extending laterally arranged bed plates, and an interchangeable roller journaled in said plates, of a pair of longitudinally extending frame plates spaced from the bed plates and rigid with the base, a hydraulic jack pivotally mounted on each frame plate and manually controlled means for operating the jacks, an elevating lever mounted on each frame plate and operative connections between said levers and jacks, said levers having axially alined journal bearings, and an interchangeable reel-elevating roller journaled in said alined bearings.

2. A hydraulic reel elevator and carrier comprising a horizontally disposed frame having parallel side bars and a transverse connecting bar at one end with the opposite end open, supporting rollers mounted on the under surface of the frame, vertically disposed bed plates with spaced roller receiving sockets in the upper edges mounted on the side bars adjacent the end of the frame closed by the transverse connecting bar, a plurality of rollers removably mounted in said sockets, bearing plates extending upward from the side bars at the open end of the frame, actuating levers with open roller carrying sockets in the ends positioned against the sides of the bearing plates, axially aligned pins pivotally mounting the said actuating levers on the bearing plates, and hydraulic jacks pivotally mounted on said bearing plates and pivotally connected to the actuating levers for elevating reels to carrying positions in the frame.

3. In a hydraulic reel elevator and carrier, the combination, which comprises, a horizontally disposed frame having parallel side bars and a transverse connecting bar at one end with the opposite end open, supporting wheels mounted on the under surface of the frame, vertically disposed bed plates with inclined upper edges and having spaced roller receiving sockets in the said upper edges mounted on the side bars adjacent the end of the frame closed by the transverse connecting bar, a plurality of rollers removably mounted in said sockets, said rollers having flanges thereon spaced to correspond with the end surfaces of flanges of the reels, bearing plates extending upward from the side bars at the open end of the frame, actuating levers with open roller carrying sockets in the ends positioned against the sides of the bearing plates, axially aligned pins pivotally mounting the said actuating levers on the bearing plates, and hydraulic jacks pivotally mounted on said bearing plates and pivotally connected to the said actuating levers for elevating reels to carrying positions in the frame.

4. A hydraulic reel elevator and carrier as described in claim 3, having aligned roller carrying sockets on the inner surfaces of the side bars spaced from the lower edges thereof.

5. In a hydraulic reel elevator and carrier as described in claim 3, a manually actuated pump mounted on the frame for supplying fluid under pressure to the said hydraulic jacks.

JOHN H. MOREHEAD.
HENRY D. SCHMIDT.

REFERENCES CITED

The following references are of record in the file of this patent:

UNITED STATES PATENTS

| Number | Name | Date |
|---|---|---|
| 1,248,896 | Olson | Dec. 4, 1917 |
| 1,817,220 | Young | Aug. 4, 1931 |
| 2,262,486 | Birky | Nov. 11, 1941 |
| 2,326,684 | Ross | Aug. 10, 1943 |

FOREIGN PATENTS

| Number | Country | Date |
|---|---|---|
| 293,383 | Germany | Aug. 9, 1916 |
| 609,135 | France | May 3, 1926 |